No. 807,665. PATENTED DEC. 19, 1905.
H. C. DEHN.
MEASURING VESSEL FOR LIQUIDS.
APPLICATION FILED JAN. 23, 1905.
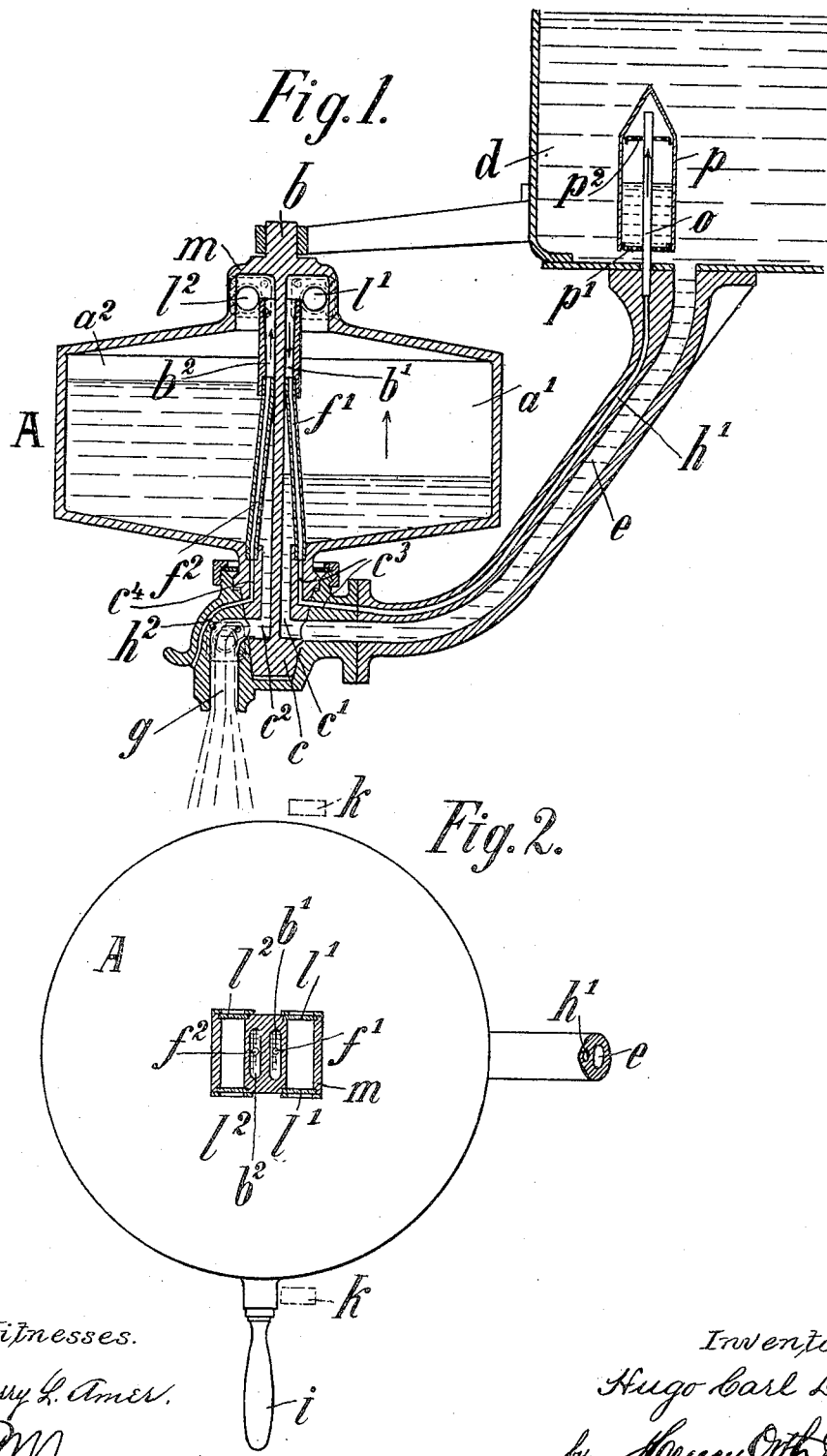

UNITED STATES PATENT OFFICE.

HUGO CARL DEHN, OF HAMBURG, GERMANY.

MEASURING VESSEL FOR LIQUIDS.

No. 807,665.      Specification of Letters Patent.      Patented Dec. 19, 1905.

Application filed January 23, 1905. Serial No. 242,357.

*To all whom it may concern:*

Be it known that I, HUGO CARL DEHN, a subject of the German Emperor, and a resident of Hamburg, Germany, have invented certain new and useful Improvements in Measuring Vessels for Liquids, of which the following is a specification.

This invention relates to improvements in measuring vessels for liquids of the class which in the known manner consist of two or more divisions or chambers, which are connected with a larger reservoir (for example, a transportable tank) and with each other by means of a valve or cock in such a manner that liquid flows into one of the divisions of the vessel out of the reservoir when one other and previously-filled division is emptied. As each of the compartments is adapted to receive a certain quantity of the liquid, the vessel may be employed for measuring quantities of liquid delivered for the purpose of sale, for example. The employment of devices of this kind for the public sale of petroleum, milk, or the like from large transportable vessels has hitherto been restricted, because known appliances of this kind for measuring liquids have not been adapted to be gaged or tested, so that they could not legally be used for effecting public sales. In order to obviate this limitation—that is to say, in order to render such appliances capable of being tested—the following arrangement is adopted in accordance with the present invention.

In the accompanying drawings, Figure 1 is a central vertical section of a measuring vessel for liquids with two divisions or chambers constructed in accordance with and embodying my invention; and Fig. 2 is a plan, partly in section, of the said liquid-measuring vessel.

Similar letters refer to similar parts throughout both views.

The measuring vessel A, which is divided into two compartments $a'$ $a^2$, is rotatably mounted by means of an ordinary solid upper trunnion $b$ and a lower trunnion $c$, which constitutes the plug of a two-way cock. The said vessel A commuicates with a larger reservoir $d$ by means of conduits or passages in such a manner that one compartment, as shown in the drawings the compartment $a'$, may be caused to communicate with the reservoir $d$ through a passage $c'$ and a conduit $e$ for liquid, also a conduit $b'$ $f'$ for air through a cock-passage $c^3$, and a conduit $h'$ with the reservoir $d$, while the other compartment $a^2$ may simultaneously be caused to communicate, through a passage $c^2$ in the cock-plug, with the fixed discharge-spout $g$ of the cock, and through an air-conduit $b^2$ $f^2$, a passage $c^4$ in the plug of the cock, and a passage $h^2$ in the cock-casing with the outer air in order that one compartment may be filled and the other emptied in the known manner. The rotation of the divided measuring vessel A may be effected by the intermediary of a handle $i$, arranged upon the vessel, and limited at the proper moment by suitable stops $k$ $k$. This measuring vessel is rendered capable of being gaged, and therefore adapted for effecting public sales, owing to the fact that the outlet $g$ is provided in the plane of the bottom of the effective measuring-chamber and each compartment or measuring-chamber at the highest point of the effective measuring-space with sight-holes or inspection-windows of a special arrangement. The provision of an inspection-window merely in the cover of each measuring-chamber $a'$ $a^2$ has proved to be insufficient, as such a window only permits of inspecting the surface of the liquid, and such an inspection does not permit of determining its exact height. Accordingly each inspection-window or pair of inspection-windows $l'$ $l^2$ is arranged laterally on the measuring-chamber or, strictly speaking, laterally on dome-shaped upper continuations $m$, into which the two air-conduits $b'$ $b^2$ partially extend. The domes $m$ inclose the air-conduits without too much play. In this arrangement the upper edge or rim of each air-conduit $b'$ $b^2$ forms a gage to which each chamber or compartment must be filled in order to deliver the proper quantity of liquid. When the liquid flowing out of the reservoir $d$ into one of the chambers has reached the upper edge of the said air-conduit, it flows into the air-conduit, which is here utilized as overflow, and the admission then ceases. Should any failure occur in the correct filling of a chamber, it may be ascertained through one of the upper sight-holes or inspection-windows, and, further, (and this is an especially important point,) the upper edge of each air-conduit, which edge corresponds with a gage-mark on the inspection-window, also remains properly utilizable as a gage when the measuring vessel assumes an inclined position, because the level of the liquid presents so small a superficial extent beside the gage edge within the dome $m$ that when the level extends to this gage edge the quantity of liquid contained in the chamber may always be taken to be the same, whether the measuring vessel is situated in an exactly upright or in a somewhat inclined position. It is only owing to this provision that it is possible to arrange the measuring vessel upon a transportable tank, so that it may be used in a form that may be gaged or tested for the sale of petroleum, milk, or the like in the streets, as the small inclination of the vessel, which is unavoidable under such circumstances, in no wise affects the exactness of the measurement. The lower inspection-window $l^3$ shows whether the whole of a measured quantity of liquid has been run off.

When the measuring vessel A is rotated so as to bring one of its compartments—for example, the compartment $a'$—in communication with the reservoir or tank $d$, liquid will flow into the said compartment and force out the air contained therein through the dome $m$, the air-conduit $b'f'$, the passage $c^3$, air-conduit $h'$ and its additional pipe $o$ into the tank $d$ under a hood or cup $p$, arranged over the upper end of the pipe $o$ and provided with two partitions $p'$ $p^2$ of wire-gauze or the like. This cup $p$ prevents the liquid of the tank from flowing into the air-conduit leading to the compartment $a'$. When the compartment $a'$ has been filled with the proper amount of liquid—that is to say, when the level of the liquid in the compartment $a'$ is flush with the upper end of the pipe $b'$ or mark on the inspection-window—any additional liquid which may enter into the compartment will flow into the conduit $b'$, so that always the determined amount of liquid is secured within the compartment $a'$. While the compartment $a'$ is being filled the compartment $a^2$ is in such position that its contents flows out through the passage $c^2$ and spout $g$, communication being established at the same time between the interior of the uppermost part of the compartment $a^2$ and the atmosphere by means of the air-conduit $b^2 f^2$, passage $c^4$, and air-conduit $h^2$, so as to allow of external air to enter the compartment $a^2$. After the compartment $a^2$ has been emptied the vessel may be turned into such position that neither of the compartments $a'$ $a^2$ is in communication with the liquid-conduit $e$ and spout $g$ or that the compartment $a'$ is in communication with the spout $g$ and air-channel $h^2$ in order to be emptied and the compartment $a^2$ in communication with the liquid-conduit $e$ and air-conduit $h'$ in order to be filled anew.

Having fully described my invention, what I claim, and desire to secure by Letters Patent, is—

1. In a measuring vessel for liquids, the combination with a supply-reservoir, of a discharge-conduit, a measuring vessel having a chamber adapted to communicate with the reservoir through said conduit and a chamber adapted to simultaneously communicate with the discharge end of the conduit, and a cock in said conduit operable by the vessel.

2. In a measuring vessel for liquids, the combination with a supply-reservoir, of a liquid and an air conduit communicating therewith, a measuring vessel having non-communicating chambers, and a cock for the conduits fixed to said vessel and having passages communicating with each of said chambers, and with said conduits.

3. In a measuring vessel for liquids, the combination with a supply-reservoir and a conduit communicating therewith, of a vessel having non-communicating chambers, a cock formed on said vessel working in said conduit and having passages leading to different chambers of the vessel and to the conduit, and means to rotate the vessel.

4. In a measuring vessel, the combination with a reservoir, and a liquid and air conduit communicating therewith, of a rotatable chambered vessel, a cock thereon having passages connecting each of said chambers with said conduits and an air-conduit in each of said chambers communicating with the aforesaid air-conduit.

5. In a measuring vessel, the combination with a reservoir, and a conduit having a liquid-channel and an air-channel therein, of a measuring vessel having a plurality of non-communicating chambers, a cock fixed to said vessel rotatably mounted in said conduit and having a passage for each chamber adapted to communicate with the liquid and air channels, and an air-conduit in each chamber adapted to communicate with said air-channel.

6. In an apparatus of the character described, a vessel having independent chambers and a liquid-passage and an air-passage in each chamber, and an overflow-conduit communicating with said air-passage, substantially as and for the purpose specified.

7. In an apparatus of the character specified, a measuring vessel having a plurality of independent chambers each provided with a liquid-passage, an air-conduit in each chamber, an overflow-conduit above said conduit, and means in the vessel for inspecting the overflow-conduit.

8. In an apparatus of the character specified, a measuring vessel, a dome formed thereon, an overflow mounted in the latter, an air-conduit communicating with said overflow, a supply-conduit communicating with said vessel and having an air-passage communicating with said air-conduit and means in the dome for inspecting the overflow.

9. In a measuring vessel for liquids, the combination with a reservoir and a conduit communicating therewith, of a chambered vessel, means to simultaneously fill and empty different chambers of said vessel and means separate from the filling means to vent, from the vessel being filled, into the reservoir.

10. In a measuring vessel for liquids, the combination with a reservoir and a conduit communicating therewith, of a rotatable chambered vessel, means to simultaneously fill and empty different chambers of said vessel, and means separate from the filling means to vent, from the vessel being filled, into the reservoir.

11. In a measuring vessel for liquids, the combination with a reservoir and a conduit communicating therewith, of a rotatable chambered vessel, means to simultaneously fill and empty different chambers of said vessel, and means separate from the filling means to vent from the top of the chamber being filled through the bottom of the reservoir.

12. In combination with a reservoir and a rotatable measuring vessel having non-communicating chambers, a liquid-conduit connecting the reservoir and one of said chambers, a conduit to return the air from the connected chamber to the reservoir and means in the reservoir to prevent the liquid therein from flowing into the air-conduit.

13. In combination with a reservoir and a rotatable measuring vessel having non-communicating chambers, a liquid-conduit communicating with the reservoir and with said chambers and adapted to simultaneously fill one chamber and empty another, an air-conduit connecting the chamber being emptied with the atmosphere, and an air-conduit connecting the other chamber with the reservoir.

14. In combination with a reservoir and a rotatable measuring vessel having non-communicating chambers, a conduit communicating with the reservoir and with said chambers and adapted to simultaneously fill one chamber and empty another, an air-conduit in the chamber being filled extending into the reservoir and a hood in the reservoir mounted over said air-conduit, for the purpose specified.

HUGO CARL DEHN.

Witnesses:
MAX KAEMPFF,
OTTO W. HELLMRICH.